US007189297B2

(12) United States Patent
Katsumura et al.

(10) Patent No.: US 7,189,297 B2
(45) Date of Patent: Mar. 13, 2007

(54) METHOD OF MANUFACTURING ESD PROTECTION COMPONENT

(75) Inventors: Hidenori Katsumura, Kobe (JP); Tatsuya Inoue, Takatsuki (JP); Hiroshi Kagata, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/003,976

(22) Filed: Dec. 6, 2004

(65) Prior Publication Data

US 2005/0141166 A1 Jun. 30, 2005

(30) Foreign Application Priority Data

Dec. 25, 2003 (JP) ............................ 2003-429446

(51) Int. Cl.
*H01C 7/10* (2006.01)
*C03B 29/00* (2006.01)
*B32B 37/06* (2006.01)
*B32B 37/12* (2006.01)

(52) U.S. Cl. .............................. 156/89.12; 156/89.16; 156/89.17; 156/89.18; 264/617; 361/118

(58) Field of Classification Search ............ 156/89.12, 156/89.16, 89.17, 89.18, 89.23
See application file for complete search history.

(56) References Cited

U.S. PATENT DOCUMENTS 3,505,633 A * 4/1970 Schimmel ................... 338/212
3,725,836 A * 4/1973 Wada et al. .................. 338/21
3,916,366 A * 10/1975 Jefferson ...................... 338/21
4,186,367 A * 1/1980 Chakrabarty et al. ......... 338/21
4,290,041 A * 9/1981 Utsumi et al. ................ 338/21
4,333,861 A * 6/1982 Aoki et al. ............ 252/519.52
4,460,624 A * 7/1984 Graciet et al. .............. 427/102
4,799,984 A * 1/1989 Rellick .................... 156/89.12
4,814,304 A * 3/1989 Takeuchi et al. .............. 501/15
5,300,163 A * 4/1994 Ohtaki .................... 156/89.15
5,870,273 A * 2/1999 Sogabe et al. ........... 361/306.3
2004/0233606 A1* 11/2004 Inoue et al. ................ 361/118
2005/0195549 A1* 9/2005 Inoue et al. ................ 361/118

FOREIGN PATENT DOCUMENTS

| | | | |
|---|---|---|---|
| FR | 2 523 993 | * | 9/1983 |
| FR | 2 542 914 | * | 9/1984 |
| JP | 63-316405 | | 12/1988 |
| JP | 9-129992 | * | 5/1997 |
| JP | 2002-252103 | * | 9/2002 |
| JP | 2003-46206 | * | 2/2003 |

* cited by examiner

*Primary Examiner*—Melvin Mayes
(74) *Attorney, Agent, or Firm*—Wenderoth, Lind & Ponack, L.L.P.

(57) ABSTRACT

A method of manufacturing an Electro Static Discharge (ESD) protection componentin which slurry including varistor particles and a resin binder is produced, and a varistor green sheet is formed from this slurry. A conductor layer is formed on a surface of the varistor green sheet. A adhesive layer is formed on a baked ceramic substrate, the varistor green sheet is adhered to the adhesive layer and then baked. The method produces a high-performance and uniform ESD protection component.

15 Claims, 3 Drawing Sheets

METHOD OF MANUFACTURING ESD PROTECTION COMPONENT

BACKGROUND OF THE INVENTION

1. Field of the Invention

The present invention relates to an Electro Static Discharge (ESD) protection component that protects an electronic device against static electricity.

2. Description of Related Art

The withstand voltage of an electronic part used for an electronic device is becoming low with a rapid progress in downsizing and higher performance of an electronic device such as a mobile phone. Consequently, the number of failures is increasing where static pulses occurring when a human body touches a terminal of an electronic device destroy an electronic part inside the electronic device.

Conventionally, the following method has been well known for protecting the electronic device from such static pulses. A laminated chip varistor or Zener diode is provided between a line to which static electricity is input and the ground, to bypass static electricity for suppressing a voltage applied to an electronic part inside an electronic device.

In addition, a growing number of antistatic areas against static pulses are seen with size reductions and higher performance of electronic devices. Consequently, demand for antistatic measures is particularly increasing for a component with a plurality of parts arranged in an array, as well as for a single part. Further, demand for downsizing and slimming down is also increasing recently.

One Electro Static Discharge (ESD) protection component that meets the demand for downsizing, arraying, and slimming down is a varistor. A method of manufacturing the varistor is disclosed in Japanese Patent Laid-Open Application No. S63-316405. The method discloses a step of screen-printing a varistor paste made of varistor powder and a glass component on one surface of a baked ceramic substrate to form a varistor pattern, and then baking it. In addition, using alumina or the like, with a high mechanical strength, for the ceramic substrate allows an ESD protection component that meets a demand for arraying and slimming down to be implemented.

Generally, it is known that the arrangement structure of particles after baking largely influences the varistor characteristic. This characteristic appears owing to the existence of an insulating layer at grain boundaries of semiconductor particles such as zinc oxide that is the principal component of a varistor. In a case where formed with screen printing, the percentage of varistor content in the paste must be small if the pattern shape is to be printed with a high degree of accuracy. Still, the uniformity of the varistor particles in the paste is not so great.

Therefore, a large number of cracks and holes occur inside a varistor film formed with conventional screen-printing, and areas without insulating films at grain boundaries of semiconductor particles like zinc oxide will increase as well. Thus, a high-performance varistor characteristic cannot be achieved with screen printing. In addition, the varistor characteristic is not uniform, which reduces reliability.

SUMMARY OF THE INVENTION

The method of manufacturing an ESD protection component according to the present invention includes at least a step of producing slurry by mixing varistor particles, a resin binder, a plasticizer, and a solvent; a step of producing a varistor green sheet by coating a film with the slurry and then drying it; a step of forming a conductor layer; a step of forming an adhesive layer including a resin as its principal component, on at least one side of a ceramic substrate; a step of sticking the varistor green sheet on the adhesive layer; and a step of baking at a temperature at which the varistor particles substantively sinter. The invention provides a method of manufacturing high-performance, small-variation ESD protection components.

DETAILED DESCRIPTION PREFERRED EMBODIMENTS

Figure 1:
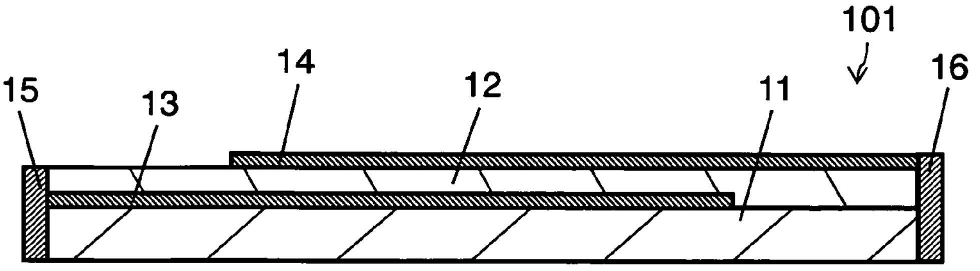
FIG. 1 is a sectional view of an ESD protection component according to the first embodiment of the present invention.

The present invention relates to a method of manufacturing an Electro Static Discharge (ESD) protection component, a method that includes at least a step of producing slurry including varistor particles and a resin binder; a step of producing a varistor green sheet from the slurry; a step of forming a conductor layer; a step of forming an adhesive layer on a ceramic substrate; a step of sticking the varistor green sheet on the adhesive layer; and a step of baking. This invention provides a method of manufacturing high-performance, highly uniform ESD protection components.

One aspect of the present invention relates to a method of manufacturing an ESD protection component where conductor layers are formed on the top and bottom of a varistor green sheet. This invention efficiently provides a method of manufacturing an ESD protection component with a more complicated structure.

A second aspect of the present invention relates to a method of manufacturing an ESD protection component where conductor layers are formed at an inner layer part and at a surface layer part of a varistor green sheet. This invention provides a method of manufacturing a higher performance varistor with high productivity.

A third aspect of the present invention relates to a method of manufacturing an ESD protection component where a varistor material is used including varistor particles with zinc oxide as its principal component. This invention provides a method of manufacturing an extremely high-performance ESD protection component.

A fourth aspect of the present invention relates to a method of manufacturing an ESD protection component that contains in the adhesive layer, at least one of inorganic components out of zinc oxide, bismuth oxide, cobalt oxide, manganese oxide, and antimony oxide. This invention provides a method of manufacturing an extremely high-performance ESD protection component with high reliability.

A fifth aspect of the present invention relates to a method of manufacturing an ESD protection component where the adhesive layer contains an inorganic component in the amount of 5% to 20% by weight. This invention provides a method of manufacturing an ESD protection component in which the varistor green sheet securely adheres to the ceramic substrate.

A sixth aspect of the present invention relates to a method of manufacturing an ESD protection component in which the porosity of the varistor green sheet stuck to the ceramic substrate is 5% to 20%. This invention provides a method of stably manufacturing a high-performance ESD protection component.

A seventh aspect of the present invention relates to a method of manufacturing an ESD protection component that uses a ceramic substrate formed with a through-hole, with a diameter of 0.1 mm to 0.5 mm, thereon. This invention provides a method of manufacturing an ESD protection component in which the varistor green sheet strongly adheres to the ceramic substrate when sintered.

An eighth aspect of the present invention relates to a method of manufacturing an ESD protection component that uses a ceramic substrate formed with slits thereon. This invention provides a method of manufacturing an ESD protection component with high productivity and low costs owing to the cost saving effects of cutting off the substrate.

A ninth aspect of the present invention relates to a method of manufacturing an ESD protection component, where the method includes a step of covering the ceramic substrate with an insulation layer made of an organic material after baking. This invention provides a method of manufacturing an ESD protection component with high reliability, with an external electrode being easily plated.

A tenth aspect of the present invention relates to a method of manufacturing an ESD protection component, where the method includes a step of covering the ceramic substrate with an insulation layer made of an inorganic material before baking. This invention provides a method of manufacturing an ESD protection component with high productivity, with an external electrode being easily plated.

An eleventh aspect of the present invention relates to a method of manufacturing an ESD protection component provided with a ceramic substrate made of a low temperature co-fired ceramic material, and having a wiring layer internally. This invention provides a method of manufacturing an ESD protection component combined with an electronic circuit.

A twelfth aspect of the present invention relates to a method of manufacturing an ESD protection component where a varistor green sheet is formed from varistor particles, a conductor layer is formed, the sheet is stuck to a ceramic substrate through an adhesive layer, and then sintered. This invention provides a method of manufacturing an ESD protection component with high performance, small variation, and high reliability, owing to the high percentage of varistor content in the green sheet, and small variation in density, enabling downsizing, arraying, and slimming down.

First Embodiment

A detailed description is made for a method of manufacturing an ESD protection component according to the first embodiment of the present invention, using an example.

FIG. 1 is a sectional view illustrating ESD protection component 101 in example 1, according to the first embodiment of the present invention.

ESD protection component 101 includes ceramic substrate 11, varistor layer 12, conductor layers 13 and 14, and terminal electrodes 15 and 16. Conductor layer 13 is formed with a conductive material such as silver, on ceramic substrate 11 such as 96% alumina. A layer made of a varistor material is formed thereon and baked to produce varistor layer 12. Further, conductor layer 14 is provided on the varistor layer 12 to form a varistor element in which varistor layer 12 is sandwiched between conductor layers 13 and 14. Finally, terminal electrodes 15 and 16 that connect to conductor layers 13 and 14, respectively, are provided at both ends of substrate 11, to complete the ESD protection component 101 having a varistor characteristic.

Next, a description is made for an example method of producing ESD protection component 101, using FIGS. 2 through 6.

First, 8.0 g of polyvinyl butyral (a binder), 5.0 g of dibutyl phthalate (a plasticizer), and 80.0 g of butyl acetate (a solvent), is added to 100 g of varistor powder which is a mixture of bismuth oxide, manganese oxide, cobalt oxide, and antimony oxide, added to zinc oxide, and then mixed in a ball mill for 40 hours to produce slurry.

Next, a PET film is coated with the slurry produced with conventional doctor blade method, for example, to produce varistor green sheet 18 with a thickness of approximately 30 μm. The thickness of the green sheet can be selected as appropriate according to a required characteristic and shape.

For example, the sheet can be used as a layered product. In order to produce varistor green sheet 18 with a required thickness from the aspect of a varistor characteristic and productivity, a plurality of green sheets with different thicknesses may be preliminarily produced and combined to obtain varistor green sheet 18 with a targeted thickness.

Figure 2:
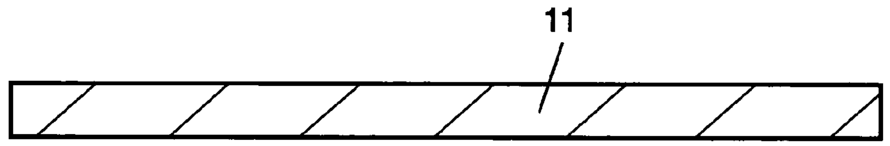
FIGS. 2 through 6 are sectional views illustrating a method of manufacturing an ESD protection component according to the first embodiment of the present invention.

Next, an alumina substrate with dimensions of 10 mm×10 mm×0.6 mm, as shown in FIG. 2 (hereinafter, referred to as alumina substrate 11), is prepared as ceramic substrate 11.

Figure 3:
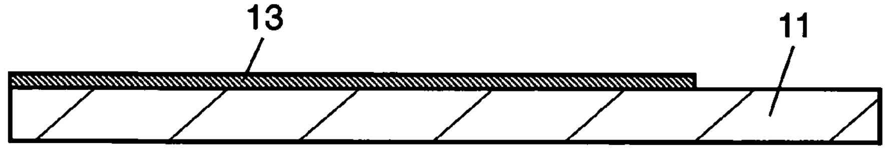

Next, as shown in FIG. 3, a silver paste or the like is printed on alumina substrate 11, and an electrode pattern is formed from conductor layer 13, and is then baked at 850° C.

Figure 4:
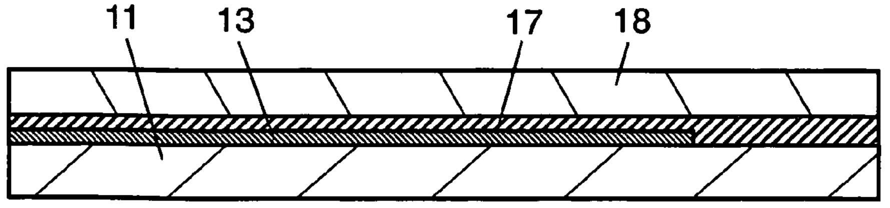

Next, as shown in FIG. 4, adhesive layer 17 is formed on alumina substrate 11 and conductor layer 13. A solution of 10% dibutyl phthalate by weight, mixed with 1% polyvinyl butyral by weight is used to form adhesive layer 17. Adhesive layer 17 is formed so as to be thin, preferably as thin as 5 μm or less. In the first embodiment, liquid adhesive is used to form adhesive layer 17; however, adhesive preliminarily formed in a form of a thin tape may be used to form adhesive layer 17 by sticking to alumina substrate 11.

Varistor green sheet 18 produced in such a way is transferred on adhesive layer 17 such that it adheres, and thermo-compressed at 100° C. and a pressure of 500 kg/cm$^2$.

Figure 5:
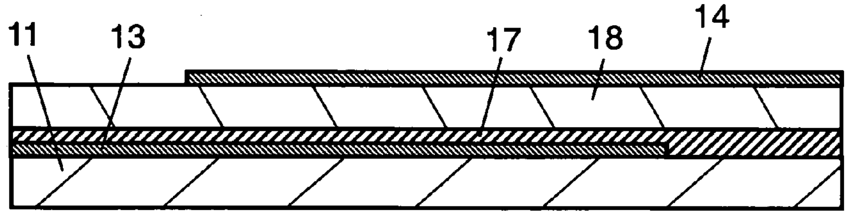

Next, an electrode pattern for conductor layer 14 is printed on varistor green sheet 18 transferred and adhered to adhesive layer 17 as shown in FIG. 5, using a silver paste or the like.

Figure 6:
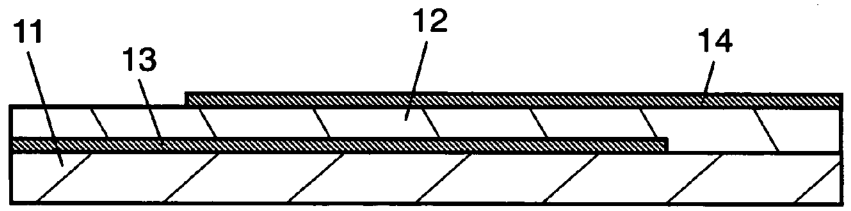

When the substrate composed as shown in FIG. 5 is baked at 900° C. for two hours, adhesive layer 17 disappears, and varistor green sheet 18 is sintered to become varistor layer 12. Consequently, the structure as shown in FIG. 6 is obtained, where varistor layer 12 sintered is fastened to ceramic substrate 11. Forming terminal electrodes 15 and 16 at both ends of this structure with silver paste and baking at 850° C. allows ESD protection component 101 to be produced.

In example 1, the description is made for a method in which conductor layer 13 is formed on alumina substrate 11, and then adhesive layer 17 is formed. As another method, the following one can be also used. That is, conductor layer 14 is formed on the top surface of varistor green sheet 18, conductor layer 13 is preliminarily printed on the bottom surface of varistor green sheet 18, and then varistor green sheet 18 is then transferred and adhered on alumina substrate 11 having adhesive layer 17.

Figure 7:
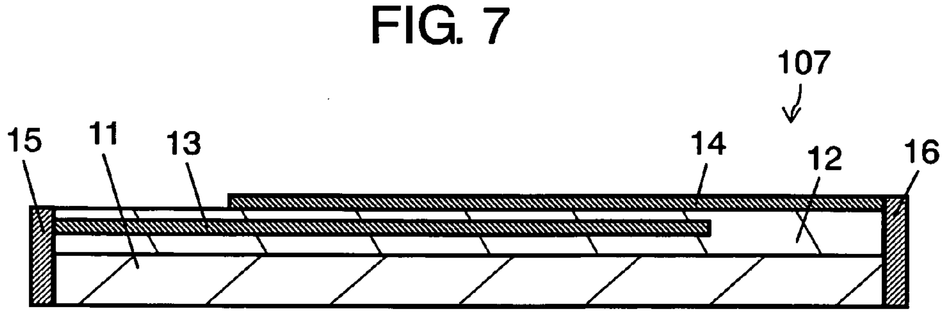
FIG. 7 is a sectional view of another example of an ESD protection component according to the first embodiment of the present invention.

FIG. 7 is a sectional view of ESD protection component 107 according to example 2 in the first embodiment of the present invention.

The basic structure of ESD protection component 107 is the same as ESD protection component 101 as shown in FIG. 1; however, it differs in that conductor layer 13 is provided at the inner layer part of varistor layer 12. In order to provide conductor layer 13 at the inner layer part of varistor layer 12, varistor green sheet 19 needs to have a laminated structure. With such a makeup, an ESD protection component having a highly reliable varistor characteristic, unaffected by alumina substrate (namely, ceramic substrate) 11 can be achieved.

Figure 8:
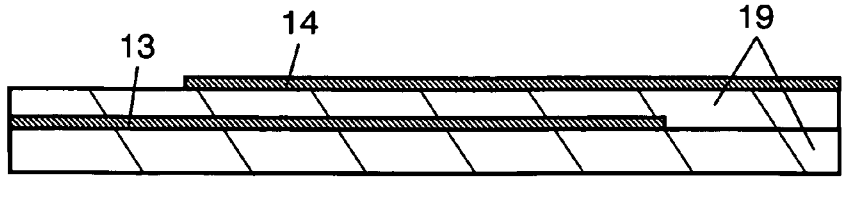
FIGS. 8 and 9 are sectional views illustrating another example of a method of manufacturing an ESD protection component according to the first embodiment of the present invention.
Figure 9:
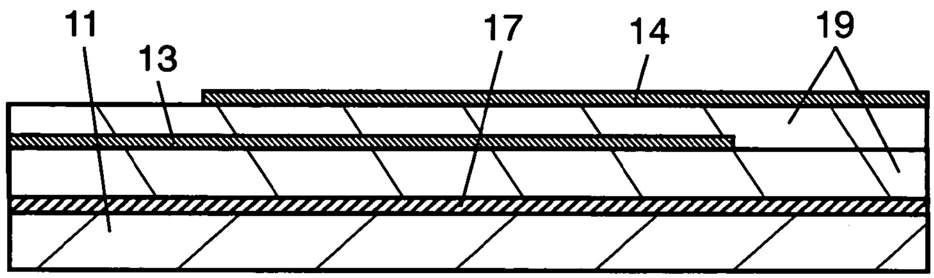

Next, a description is made for an example method of producing ESD protection component 107 according to example 2, using FIGS. 8 and 9.

First, varistor green sheet 19 is produced in the same way as in example 1. Varistor green sheet 19 is cut into two sheets having the dimensions 10 mm×10 mm, and electrode patterns for conductor layers 13 and 14 are printed and formed on respective varistor green sheets 19 using silver paste with screen printing.

After that, as shown in FIG. 8, varistor green sheets 19 with conductor layers 13 and 14 printed are stacked so that the positions of the electrode patterns of respective conductor layers 13 and 14 conform, and then they are pressed at 40° C. and a pressure of 100 kg/cm$^2$, to produce a layered product of varistor green sheet 19.

Next, as shown in FIG. 9, the adhesive described in example 1 is coated on alumina substrate 11 having the dimensions 10 mm×10 mm×0.6 mm to form adhesive layer 17 with a thickness of 1 μm. A layered product of varistor green sheet 19 is further transferred and adhered to adhesive layer 17, and then thermo-compressed at 100° C. and a pressure of 500 kg/cm$^2$.

The substrate produced in this way is baked at 900° C. for two hours. Further, terminal electrodes 15 and 16 are coated and formed on both end surfaces with silver paste, and then baked at 850° C. to produce ESD protection component 107.

With the method of manufacturing according to example 2, an ESD protection component having a minute and highly accurate conductor structure can be produced efficiently.

Table 1 shows the varistor characteristic (voltage-current characteristic) of an ESD protection component produced in such a way. Still, as a comparative example, an ESD protection component with the structure shown in FIG. 1 is produced using varistor paste that is a mixture of 60% varistor particles by weight and 40% a vehicle by weight, which is a mixture of ethyl cellulose and alpha-terpineol mixed at a weight ratio of 1:9, with screen printing. The character of the comparative example is shown in FIG. 1.

Hereinafter, an evaluation method is described.

V (1 mA), which is a voltage when a current of 1 mA is applied between terminal electrodes 15 and 16 of the ESD protection component produced; and V (0.1 mA), which is a voltage when a current of 0.1 mA is applied, are measured, and V (1 mA)/V (0.1 mA), which is a ratio of both voltages, is evaluated as varistor characteristic α-value. A varistor characteristic α-value closer to 1 shows a better varistor characteristic, meaning an excellent ESD protection component is produced.

As shown in table 1, α-values of the sample numbers 11 through 15 are all 1.5 or more, meaning a poor varistor characteristic, and its ratio varies widely between 1.5 and 2.0, for the samples that are produced by screen-printing the varistor paste for comparative examples. The close-up observation of the samples for the comparative examples reveals many large bores and cracks inside the varistor layer. These bores and cracks presumably cause deterioration and variation in varistor characteristic.

TABLE 1

| Sample No. | Producing method | Varistor characteristic |
|---|---|---|
| 11 | Comparative example | 1.54 |
| 12 | (Paste printing method) | 1.87 |
| 13 | | 1.98 |
| 14 | | 1.62 |
| 15 | | 1.48 |
| 21 | Example 1 (FIG. 1) | 1.21 |
| 22 | | 1.2 |
| 23 | | 1.19 |
| 24 | | 1.19 |
| 25 | | 1.22 |
| 31 | Example 2 (FIG. 7) | 1.22 |
| 32 | | 1.23 |
| 33 | | 1.22 |
| 34 | | 1.21 |
| 35 | | 1.21 |

Meanwhile, for sample numbers 21 through 25, which relate to the ESD protection component 101 of example 1 produced with the method described in the first embodiment, and for sample numbers 31 through 35, which relate to ESD protection component 107 in example 2, it is proved that the values of varistor characteristic α-value have an average of approximately 1.2, which is excellent, and its variation is small.

Second Embodiment

In the second embodiment of the present invention, a description is made for the component of adhesive to be used for adhesive layer 17. In the first embodiment, adhesive layer 17 is formed using a solution of polyvinyl butyral and dibutyl phthalate mixed at a weight ratio of 1:10. Varistor particles, and inorganic materials, namely constituent materials for varistor particles, such as zinc oxide, bismuth oxide, cobalt oxide, manganese oxide, or antimony oxide, are dispersed in the solution.

Table 2 compares the characteristics of an ESD protection component when changing the kind of inorganic material dispersed in adhesive layer 17, and its added amount (added amount per 100 g of adhesive). Ten pieces of ESD protection components 107 are produced per each condition using substrates with dimensions of 15 cm×15 cm. The probability that peeling occurs after baking and the average value of the varistor characteristics α are measured as evaluation items.

As shown in table 2, sample 41 with no adhesive added, and sample 42 with a small amount of adhesive added, show peeling after baking with probabilities of 2/10 and 1/10, respectively. Meanwhile, sample 46 with adhesive added with 25% of the inorganic material by weight shows peeling because adhesive layer 17 is less effective. In contrast, the samples with adhesive added 5% to 20% by weight, which is within the range according to the present invention, show no peeling, even for a large substrate, and the varistor characteristic ac is also excellent, between 1.15 and 1.20. From these results, the addition amount of varistor particles to adhesive layer 17 is desirably 5% to 20% by weight.

Still, as in samples 47 through 56, adding the inorganic material composing varistor particles, such as zinc oxide, bismuth oxide, cobalt oxide, manganese oxide, and antimony oxide, instead of varistor particles, also results in the same effect. In such a case, the added amount is also desirably 5% to 20% by weight.

As described above, adding a proper amount of varistor particles, which are inorganic components, and an inorganic material composing varistor particles, such as zinc oxide, bismuth oxide, cobalt oxide, manganese oxide, and antimony oxide, in the adhesive composing adhesive layer 17, suppresses peeling when baking, thus providing a method of manufacturing an ESD protection component with excellent varistor characteristic α.

TABLE 2

| Sample number | Added component | Added amount (by weight | Probability of peeling | Varistor characteristic |
|---|---|---|---|---|
| 41 | Varistor | 0 | 2/10 | 1.21 |
| 42 | Varistor | 3% | 1/10 | 1.19 |
| 43 | Varistor | 5% | 0/10 | 1.15 |
| 44 | Varistor | 10% | 0/10 | 1.14 |
| 45 | Varistor | 20% | 0/10 | 1.14 |
| 46 | Varistor | 25% | 2/20 | 1.16 |
| 47 | Zinc oxide | 5% | 0/10 | 1.18 |
| 48 | Zinc oxide | 20% | 0/10 | 1.15 |
| 49 | Bismuth oxide | 5% | 0/10 | 1.16 |
| 50 | Bismuth oxide | 20% | 0/10 | 1.15 |
| 51 | Cobalt oxide | 5% | 0/10 | 1.15 |
| 52 | Cobalt oxide | 20% | 0/10 | 1.14 |
| 53 | manganese oxide | 5% | 0/10 | 1.16 |
| 54 | manganese oxide | 20% | 0/10 | 1.15 |
| 55 | antimony oxide | 5% | 0/10 | 1.16 |
| 56 | antimony oxide | 20% | 0/10 | 1.15 |

Third Embodiment

The third embodiment of the present invention describes a relation of the porosity of varistor green sheet 19 shown in FIG. 8 with adhesiveness on alumina substrate 11 and with the varistor characteristic. The porosity of varistor green sheet 19 used in the third embodiment of the present invention is obtained from equation 1 described below.

In the third embodiment, the pressing pressure and temperature in the transferring or laminating step are changed to control the porosity of varistor green sheet 19.

Ten pieces of ESD protection components 107 shown in FIG. 7 are produced using a layered product of varistor green sheet 19, and the relation is evaluated between the probability that peeling occurs after baking or the average value of the varistor characteristic to the porosity of varistor green sheet 19. The result is shown in table 3. Still, the porosities of varistor green sheets 18 and 19 are 22% below the conditions in the first and second embodiments. In addition, the adhesive used in the first embodiment, without varistor particles added, is used for adhesive layer 17.

As shown in table 3, increasing the pressure in the step of transferring or laminating to decrease the porosity causes the varistor characteristic α-value to be reduced as in samples 61 through 65. In a porosity range of 5% to 20%, the α-value is excellent, 1.10 to 1.15, proving that a high-performance ESD protection component is yielded.

However, reducing the porosity down to 3% as in sample 66 results in a probability as large as 4/10 that peeling occurs after baking. This is because if the porosity is too low, s air becomes trapped at the interface between the layered product of varistor green sheet 19 and alumina substrate 11, when laminating onto alumina substrate 11, which generates incompletely contacting areas. From the above, the porosity of varistor green sheet 19 to be stuck to alumina substrate 11 is desirably 5% to 20%.

TABLE 3

| Sample number | Porosity | Probability of peeling | Varistor characteristic |
|---|---|---|---|
| 61 | 22% | 2/10 | 1.21 |
| 62 | 20% | 1/10 | 1.15 |
| 63 | 15% | 1/10 | 1.14 |
| 64 | 10% | 0/10 | 1.13 |
| 65 | 5% | 2/10 | 1.12 |
| 66 | 3% | 4/10 | 1.11 |

Fourth Embodiment

The fourth embodiment of the present invention prepares alumina substrate 11 provided with a through-hole with a diameter of 0.2 mm at 0.5 mm intervals, roughly all over the surface. When adhering the layered product of varistor green sheet 19, which is sample 66 with porosity 3%, used in the third embodiment, to alumina substrate 11, and baking it, no peeling occurs after baking.

This shows that air can successfully escape through a through-hole bored in alumina substrate 11. Therefore, even varistor green sheet 19 having a small porosity can be successfully exhausted, which the air at the interface between the layered product of varistor green sheet 19 and alumina substrate 11 is difficult to vent. Consequently, the layered product of varistor green sheet 19 is presumably able to contact the whole surface of alumina substrate 11, because air does not remain between the layered product and alumina substrate 11.

$$(\text{Porocity}) = 1 - \frac{\text{Apparent\_density\_of\_green\_seat}}{\dfrac{\text{Weight\_of\_varister\_partcles} + \text{Weight\_of\_binder} + \text{Weight\_of\_plasticize}\,r}{\dfrac{\text{Weight\_of\_varister\_partcles}}{\text{Density\_of\_varister}} + \dfrac{\text{Weight\_of\_binder}}{\text{Density\_of\_binder}} + \dfrac{\text{Weight\_of\_plasticize}\,r}{\text{Density\_of\_plasticize}\,r}}} \quad \text{(Formula \_1)}$$

Table 4 shows the evaluation result for samples provided with through-holes having different diameters and different porosities. Samples 71 through 75 shown in table 4 are those adhered with the layered product of varistor green sheet 19 with a small porosity, used for sample 66, on alumina substrate 11 with through-holes having different diameters, and then baked. The probability of peeling in table 4 is the evaluation result of the peeling ratio of varistor layer 12 from alumina substrate 11 after baking.

TABLE 4

| Sample number | Diameter of through-hole | Probability of peeling | Crack |
|---|---|---|---|
| 71 | 0.08 mm | 3/10 | None |
| 72 | 0.1 mm | 0/10 | None |
| 73 | 0.2 mm | 0/10 | None |
| 74 | 0.5 mm | 0/10 | None |
| 75 | 0.6 mm | 0/10 | Cracks on the periphery |

As shown in table 4, when the diameter of a through-hole is less than 0.1 mm, such as in sample 71, it is more difficult for air to escape and the peeling rate is increased. When the diameter is larger than 0.1 mm, the peeling rate becomes 0/10, a favorable value. However, when the diameter is more than 0.5 mm, varistor layer 12 deforms at the periphery of the through-hole, which causes cracks to occur. This proves the diameter of a through-hole bored on alumina substrate 11 is desirably 0.1 mm to 0.5 mm. In this way, providing a through-hole on alumina substrate 11 enables varistor green sheet 19, with a small porosity, to be transferred and adhered uniformly on the whole surface of alumina substrate 11, without bubbles remaining at the interface to be bonded. This provides a method of manufacturing an ESD protection component that prevents peeling from occurring after baking.

Fifth Embodiment

Figure 10:
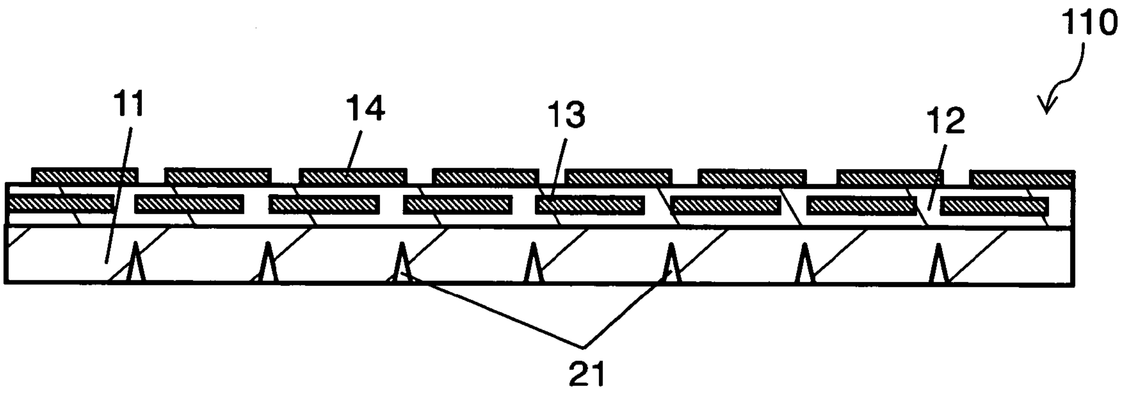
FIG. 10 is a sectional view of an ESD protection component according to the sixth embodiment of the present invention.

FIG. 10 is a sectional view illustrating one step in the method of manufacturing an ESD protection component according to the fifth embodiment of the present invention.

The ESD protection component in the fifth embodiment differs from ESD protection component 107 described in the first embodiment in that alumina substrate 11 has a slit 21 with a depth of 0.1 mm on at least one side. After varistor green sheets 18 and 19 are adhered through adhesive layer 17 with the same method as in embodiments 1 and 2, on the other surface of alumina substrate 11, where slit 21 is not formed, collected body 110 is produced and formed with varistor layer 12 and conductor layers 13 and 14 by baking.

Next, applying a stress to slit 21 of collected body 110 along alumina substrate 11 can dice alumina substrate 11 together with varistor layer 12 baked, with slit 21 as a base point. In this case of dicing, peeling at the interface of varistor layer 12 and alumina substrate 11, chips in varistor layer 12, or the like is not found, which ensures no defect is occurring.

Usually, when dicing an object formed with a large number of ESD protection components in a matrix form on alumina substrate 11, a dicer or the like is used for cutting off. Such a conventional dicing method requires time and money, while the method according to the present invention has an advantage that dicing is made very efficiently and reliably.

Sixth Embodiment

Figure 11:
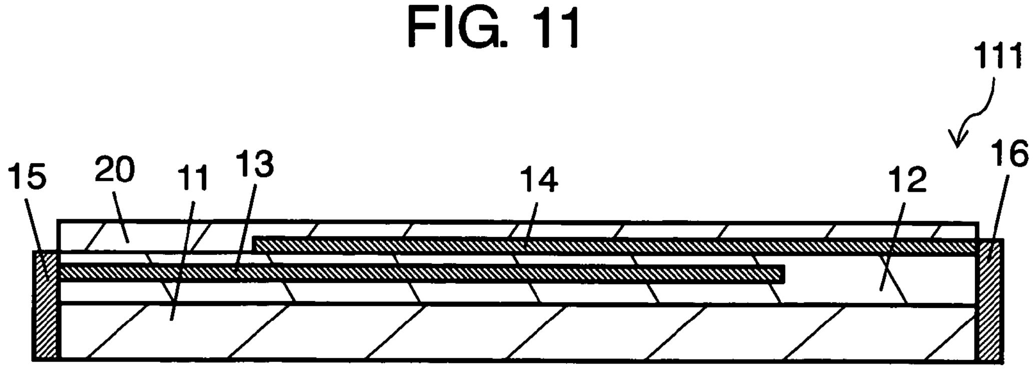
FIG. 11 is a sectional view of an ESD protection component according to the seventh embodiment of the present invention.

FIG. 11 is a sectional view illustrating a method of manufacturing an ESD protection component 111 according to the sixth embodiment of the present invention.

Because ESD protection component 111 is used as a surface mounting part, the surface layer can be nickel-tin-plated for improving solder wettability of terminal electrodes 15 and 16.

In this case, if the surface of varistor layer 12 is exposed, a problem arises in which short circuits are caused due to a deposition of a plated film on the surface of varistor layer.

In order to solve this problem, a thermosetting resin is printed so as to cover the surface of varistor layer 12 after baking, and is heated for curing at a predetermined temperature to form an insulation layer 20. Forming the insulation layer 20 eliminates exposure of varistor layer 12, and thus a plated film does not deposit on the surface of varistor layer 12 even if nickel-tin-plated is used, which prevents.

In addition, it is also possible to form insulation layer 20 from glass before baking varistor green sheets 18 and 19. In this case, a glass paste is printed or laminated on the outer most surfaces of varistor green sheets 18 and 19 before baking. Alumina substrate 11, varistor green sheets 18 and 19, conductor layers 13 and 14, and the glass paste layer having been formed, are baked at the same time to produce ESD protection component 111 including insulation layer 20 made of glass. Forming insulation layer 20 on the varistor layer 12 with this method prevents a plated film from depositing on varistor layer 12 even if nickel-tin-plated is used, and thus a short circuit does not occur. Making insulation layer 20 of glass allows the heat resistance and reliability to be further enhanced.

Here, a material for insulation layer 20 is not especially limited as far as it does not deteriorate the varistor characteristic. For example, glass ceramic or borosilicate glass that has a property of low-temperature co-firing, including alumina for example, can be used.

Seventh Embodiment

Hereinafter, a description is made for an example of manufacturing an ESD protection component using a ceramic substrate including a wiring layer inside the ceramic substrate that is made of a low temperature co-fired ceramic material, with a method of manufacturing according to the present invention.

An example is shown where a low temperature co-fired ceramic material made of a mixture of ceramic and glass is used for ceramic substrate 11.

Initially, a material that is a mixture of alumina and borosilicate barium glass at a ratio of 50:50 by weight is produced, and then a ceramic green sheet is produced with e roughly the same method as for varistor green sheet 18 in the first embodiment. A through-hole is formed at a predetermined position of this ceramic green sheet using a puncher or $CO_2$ laser stepping, and then an electrode is embedded in the through-hole using silver paste.

Meanwhile, a predetermined electrode pattern is formed on the surface of the ceramic green sheet, using conductor paste including silver as its principal component, with screen printing, for example. After these ceramic green sheets are laminated with high accuracy, a layered product is produced that is a laminated green sheets for restraining using alumina or the like, on both top and bottom main surfaces of the layered product of the ceramic green sheet.

After this integrated layered product is baked at 900° C., a temperature at which a glass-ceramic material is substantively baked, alumina, which is the principal component of the restraining green sheet that does not sinter to remain, is removed with a mechanical process, thus obtaining a glass-ceramic substrate excellent in dimensional accuracy for a planar direction.

At the inner layer part of this glass-ceramic substrate, an element can be composed such as a capacitor element that is composed by internal electrode patterns facing each other, and an inductor element that is formed by routing a conductor in a spiral or meander form. These capacitor elements and inductor elements are further wired internally and/or connected with via electrodes to form an electronic circuit.

This glass-ceramic substrate is used as ceramic substrate 11 shown in the first embodiment, varistor green sheet 18 is adhered through adhesive layer 17 with the same method as in the first embodiment, and then sintered. This fastens varistor layer 12 to ceramic substrate 11 made of a glass-ceramic substrate, and an electronic circuit part having an ESD protection component is obtained. In a conventional electronic circuit part, chip ESD protection components are surface-mounted on a glass-ceramic substrate. Therefore, a method of manufacturing an ESD protection component according to the present invention has an advantage that an electronic circuit with a small ESD protection component can be implemented.

As described above, a method of manufacturing according to the present invention allows a high-performance, uniform and highly reliable ESD protection component to be manufactured, which is useful for measures protecting against static electricity for an electronic device such as a mobile phone.

What is claimed is:

1. A method of manufacturing an Electro Static Discharge (ESD) protection component comprising:

producing slurry by mixing varistor particles of varistor material, a resin binder, a plasticizer, and a solvent;

producing a varistor green sheet by coating a film with the slurry and by drying the slurry;

forming first and second conductor layers, the first conductor layer being formed at least on one surface of the varistor green sheet;

forming an adhesive layer with a resin as a principal component thereof on at least one side of a baked ceramic substrate;

adhering the varistor green sheet onto the baked ceramic substrate via the adhesive layer to form a laminate comprising the baked ceramic substrate, the varistor green sheet and the first and second conductor layers;

sintering the varistor green sheet to form a varistor layer; and forming terminal electrodes on both end surfaces of the varistor layer and the baked ceramic substrate to form the ESD protection component.

2. A method of manufacturing the ESD protection component as claimed in claim 1, wherein said forming of the first and second conductor layers further comprises forming the first conductor layer on a top surface of the varistor green sheet, and forming the second conductor layer on a bottom surface of the varistor green sheet.

3. A method of manufacturing the ESD protection component as claimed in claim 1, wherein said forming of the first and second conductor layers further comprises forming the second conductor layer at an inner layer part of the varistor green sheet and forming the first conductor layer at a surface part of the varistor green sheet, by laminating a first varistor green sheet having the first conductor layer on a surface thereof, and a second varistor green sheet having the second conductor layer on a surface thereof, such that the second conductor layer of the second varistor green sheet faces a surface of the first varistor green sheet on which the first conductor layer is not formed.

4. A method of manufacturing the ESD protection component as claimed in claim 1, wherein the varistor particles are made of varistor material including zinc oxide as a principal component thereof.

5. A method of manufacturing the ESD protection component as claimed in claim 1, wherein the adhesive layer includes at least one inorganic component out of zinc oxide, bismuth oxide, cobalt oxide, manganese oxide, and antimony oxide.

6. A method of manufacturing the ESD protection component as claimed in claim 5, wherein the adhesive layer includes the inorganic component in the amount of 5% to 20% by weight.

7. A method of manufacturing the ESD protection component as claimed in claim 1, wherein said producing of a varistor green sheet comprises producing a varistor green sheet having a porosity of 5% to 20%.

8. A method of manufacturing the ESD protection component as claimed in claim 1, wherein the baked ceramic substrate includes a member having a through-hole with a diameter of 0.1 mm to 0.5 mm.

9. A method of manufacturing the ESD protection component as claimed in claim 1, wherein the baked ceramic substrate includes a member having a slit on at least one surface of the baked ceramic substrate, and the method further comprises dividing the baked ceramic substrate along the slit after said sintering.

10. A method of manufacturing the ESD protection component as claimed in claim 1, further comprising covering at least one side of the baked ceramic substrate with an insulation layer after said sintering.

11. A method of manufacturing the ESD protection component as claimed in claim 1, further comprising covering at least one side of the baked ceramic substrate with an insulation layer made of inorganic material before said sintering.

12. A method of manufacturing the ESD protection component as claimed in claim 1, wherein the baked ceramic substrate is a layered ceramic substrate having an internal wiring layer including silver or copper as a principal component thereof, and said forming of an adhesive layer comprises forming the adhesive layer on the layered ceramic substrate.

13. A method of manufacturing the ESD protection component as claimed in claim 1, further comprising forming the second conductor layer on the baked ceramic substrate, wherein the adhesive layer with the resin as the principal component is formed on the second conductor layer and on the baked ceramic substrate in said forming the adhesive layer.

14. A method of manufacturing the ESD protection component as claimed in claim 1, wherein said forming the adhesive layer further comprises coating the adhesive layer on the baked ceramic substrate.

15. A method of manufacturing the ESD protection component as claimed in claim 1, wherein said forming the adhesive layer further comprises applying an adhesive layer preliminarily formed of a thin tape on the baked ceramic substrate.

* * * * *